United States Patent [19]

Yamada et al.

[11] Patent Number: 5,461,480
[45] Date of Patent: Oct. 24, 1995

[54] PARTS RECOGNIZING DEVICE FOR MOUNTING MACHINE

[75] Inventors: Naoji Yamada; Kenji Egashira, both of Iwata, Japan

[73] Assignee: Yamaha Hatsudoki Kabushiki Kaisha, Iwata, Japan

[21] Appl. No.: 257,359

[22] Filed: Jun. 9, 1994

[30] Foreign Application Priority Data

Jun. 14, 1993 [JP] Japan .................. 5-142165

[51] Int. Cl.⁶ .................................................. G01B 11/00
[52] U.S. Cl. .................................. 356/394; 356/375
[58] Field of Search .......................... 356/375, 237, 356/394; 29/721, 759

[56] References Cited

U.S. PATENT DOCUMENTS

| | | | |
|---|---|---|---|
| 4,628,464 | 12/1986 | McConnell | 356/375 |
| 4,793,707 | 12/1988 | Hata et al. | 356/375 |
| 4,867,569 | 9/1989 | Mohara | 356/375 |
| 5,131,139 | 7/1992 | Oyama et al. | 29/721 |
| 5,224,262 | 7/1993 | Takaichi et al. | 29/721 |

Primary Examiner—Richard A. Rosenberger
Attorney, Agent, or Firm—Knobbe, Martens, Olson & Bear

[57] ABSTRACT

A component recognition system embodying an electronic camera and a lighting arrangement which permits recognition of components carried by a pick-up device either by direct lighting or by back lighting depending upon the size of the and type of the component picked up. This permits the recognition of a large number of different types of components in a single station.

14 Claims, 10 Drawing Sheets

PARTS RECOGNIZING DEVICE FOR MOUNTING MACHINE

BACKGROUND OF THE INVENTION

This invention relates to a parts recognizing device and more particularly to an improved optical parts recognizing device for use with component mounting apparatus.

There are a wide variety of devices commonly referred to as "chip mounters" that are employed to pick up small components at one location and mount them in an accurate position on an article such as a printed circuit board or the like. These devices are particularly useful and frequently employ pick-up nozzles such as vacuum operated pick-up nozzles for selecting the components and positioning them.

In connection with this type of apparatus, normally some optical device is employed for either or both of the purposes of identifying the component that has been picked up and/or determining the orientation of the component relative to the pick-up device. Regardless of which type of recognition is employed or even if both recognitions are employed, it is generally the practice to utilize for recognition purposes an electronic camera such as a capacitor couple device (CCD) and a light source. The light source illuminates the component that is picked up so that the camera can take an image of it.

As is noted above, this recognition can serve one or both of two purposes. First, the camera and associated computer control may be employed to recognize and assure that the correct component has been picked up by the pick-up device from the feed station. The other purpose is to determine the orientation of the component relative to the pick-up device. The reason for this is that it is difficult if not impossible to insure that each component will be picked up in exactly the same orientation. Therefore, a variety of methods have been employed for determining if the component as picked up is offset relative to the pick-up device so that corrections may be made in the location of the pick-up device relative to the circuit board prior to assembly.

Normally it has been the practice to perform the recognition in a specific location on the apparatus and in this recognition area there is provided both the light source and the electronic camera. However, the use of a single type of light source and a single electronic camera can present some problems because the components which are positioned and mounted on the circuit boardscan have different natures that require different types of recognition. For example, if the light source is mounted on the same side of the pick-up device as the camera, then the camera will recognize the component by directly seeing its image. With some forms of components this is acceptable. However, with other types of components this may not be an acceptable recognition method. For example, if the component has a plurality of lead wires which must be connected to the circuit board and these are disposed adjacent the side to be mounted, then the lead wires will give a reflection from the light source that can make it difficult to determine both the type of component and the location of the lead wires.

On the other hand, if the light source is disposed on the opposite side of the component from the electronic camera so that the camera will sense the shadow of the object, then other difficulties can be encountered. If the part is particularly small, the pick-up device itself may obscure the light and may make it difficult to both identify and determine the location of the component.

In order to ensure that the apparatus is capable of handling a wide variety of components and recognizing both the component and/or its orientation, it has, therefore, been necessary previously to provide a number of different recognition stations some of which use direct illumination and some of which use back lighted illumination in order to recognize and orient the component. Obviously, this adds considerably to the cost of the mechanism. In addition to this, it can also have the effect of slowing down or retarding the speed of operation, also an objectionable result.

It is, therefore, a principal object of this invention to provide an improved parts recognition mechanism for a mounting machine.

It is a further object of this invention to provide an optical parts recognizing system for a mounting machine that will permit either direct or back lighting for recognition purposes in the same station.

It is a further object of this invention to provide an improved recognition arrangement for a mounting machine wherein the use of separate stations and separate recognition modes can be avoided.

It is a still further object of this invention to provide an improved component recognition system for a mounting machine wherein alternate light sources can be employed in the same station and without necessitating duplication of components.

It is a further object of this invention to provide an improved optical recognition arrangement for a mounting machine that permits recognition by either direct or back lighting in a single station and with a minimum number of light sources and a single electronic camera.

SUMMARY OF THE INVENTION

A first feature of this invention is adapted to be embodied in a recognizing arrangement for a component mounter that is comprised of a pick-up device adapted to hold and transport components. A camera is positioned on one side of the pick-up device to face one side of a component carried by the pick-up device. Illumination means including at least a light source and operable between a first condition in which the side of the component facing the camera is illuminated for direct recognition by the camera and a second condition wherein the back side of the component is illuminated for recognizing the shadow of the component on the camera.

Another feature of the invention is adapted to be embodied in a recognizing arrangement for a component mounter comprised of a pick-up device adapted to hold and transport components. A camera is positioned on one side of the pick-up device to face one side of a component carried by the pick-up device. Illumination means are movably supported relative to the camera on the one side of the component between a first position and a second position for providing different optical illumination conditions.

A still further feature of the invention is also adapted to be embodied in a recognizing arrangement for a component mounter that is comprised of a pick-up device adapted to hold and transport components. A camera is positioned on one side of the pick-up device to face one side of a component carried by the pick-up device. A first light source is disposed adjacent the camera on the one side of the pick-up device for direct recognition of the one face of the component. A second light source is positioned on the opposite side of the component from the camera for casting a shadow of the component on the camera for another type of recognition.

DETAILED DESCRIPTION OF THE PREFERRED EMBODIMENTS OF THE INVENTION

Figure 1:
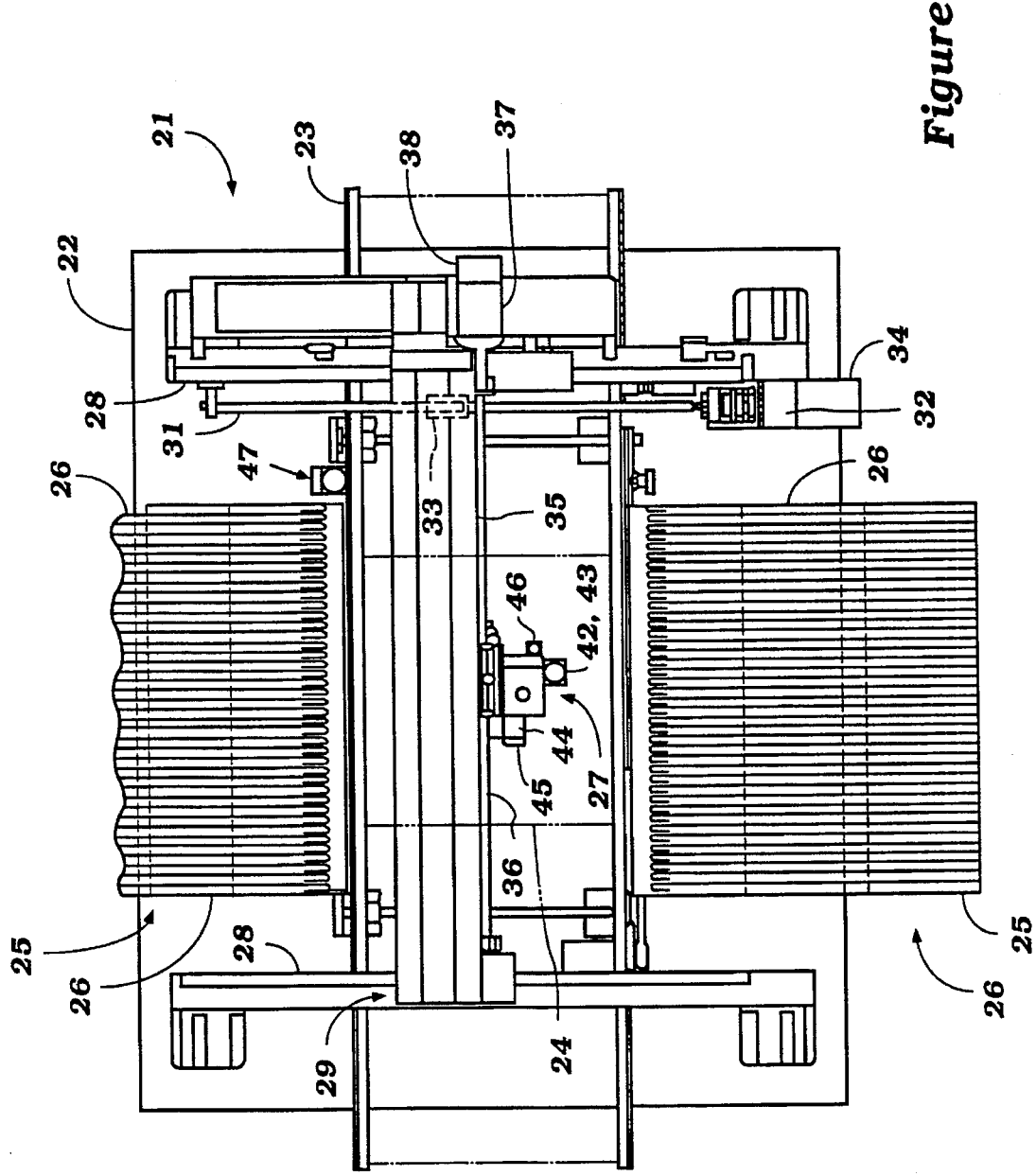
FIG. 1 is a top plan view of a component mounting and recognition device constructed in accordance with the invention.
Figure 2:
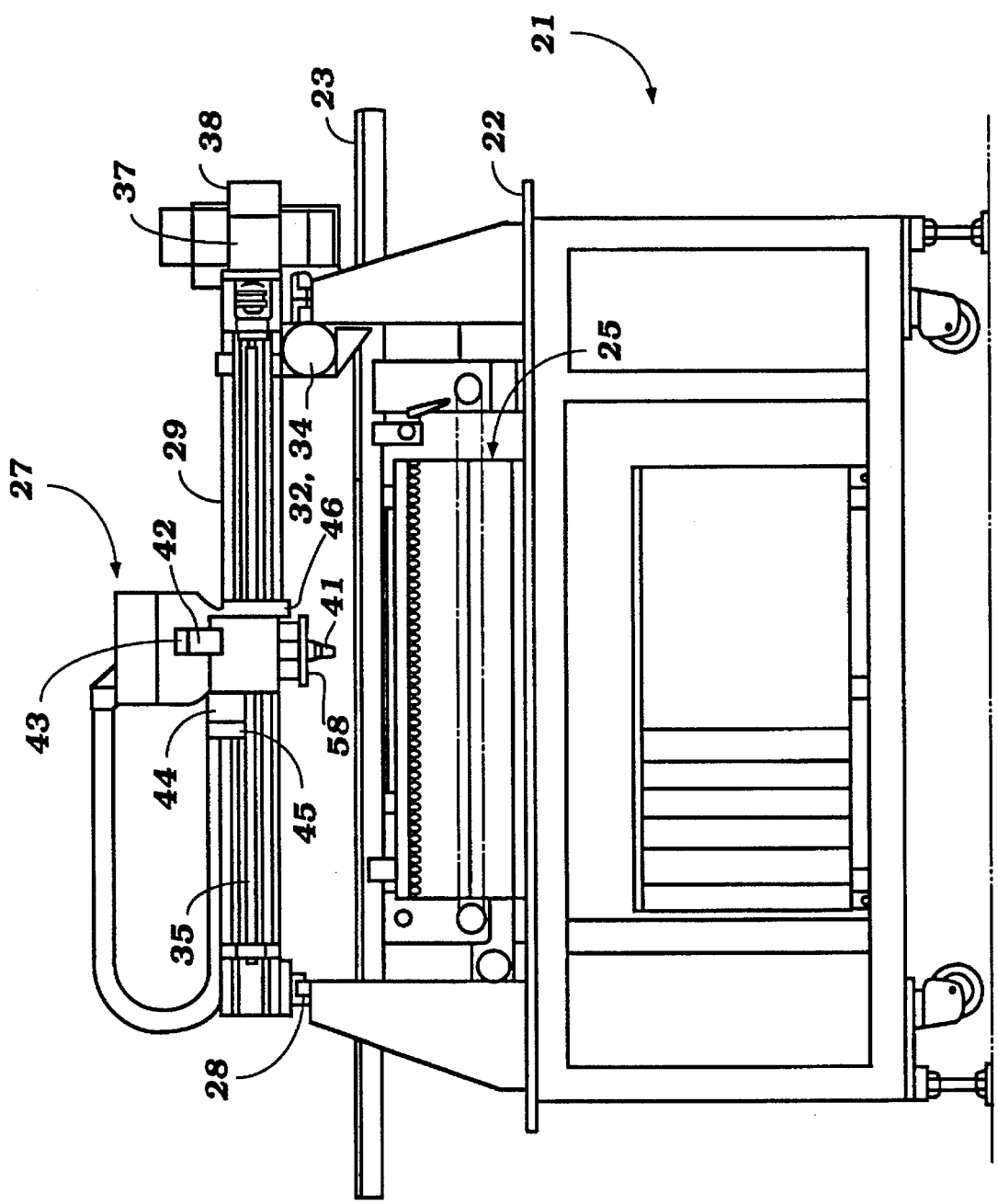
FIG. 2 is a front elevational view thereof.

Referring now in detail to the drawings and initially to FIGS. 1 and 2, a component mounting and recognizing apparatus constructed in accordance with an embodiment of the invention is identified generally by the reference numeral 21. The apparatus 21 includes a component mounter 22 that is associated with a conveyor section 23 which passes through the area defined by the mounter 22. The conveyor 23 is adapted to convey printed circuit boards, one of which is shown in phantom in FIG. 1 and is identified by the reference numeral 24 to a mounting position as shown.

This mounting position is disposed between a pair of feeder assemblies, each indicated generally by the reference numeral 25 and each of which is comprised of a plurality of side-by-side tape feeders 26. The tape feeders 26, as is well known in this art, contain rolls of tape having small pockets in which components to be mounted such as integrated circuits, resistors, capacitors or the like are contained. Each tape feeder 26 has a rachet mechanism which incrementally advances the tapes so that a particular component will be presented for pickup and mounting on the circuit boards 24. It should be noted that, although this invention is described in conjunction with the mounting of electrical components on printed circuit boards, the invention may be utilized with a wide variety of types of apparatus that are employed for picking up components, particularly small intricate components, and positioning and assembling them on a substrate.

The components are picked up and deposited by a pick-up head assembly, indicated generally by the reference numeral 27 and which has a construction as will be described later by reference to FIG. 3. The mounting head assembly 27 is mounted for movement in the X and Y directions relative to the conveyor 23 in a manner which will now be described.

There are provided a pair of guide rails 28 which are spaced apart at a distance slightly greater than the space required by the feeder sections 25 and which extend in the Y—Y direction. These guide rails 28 support a carriage assembly 29 which carriage assembly is moved along the guide rails 28 by means of a feed screw 31 that is driven by a servomotor 32 and which is disposed in a fixed relation to one of the guide rails 28 (the right-hand one as seen in FIG. 1). The feed screw 31 cooperates with a recirculating ball nut 33 that is affixed to the carriage 29 in a known manner. As a result, when the feed screw 31 is rotated, the carriage assembly 29 will be transported in the Y axis directions. An encoder 34 is connected to the Y axis drive motor 32 and outputs a signal to an appropriate computer control that will indicate the Y axis position of the carriage assembly 29, and accordingly the mounter head 27.

The carriage 29 has a pair of guide rails 35 on which the mounter head assembly 27 is supported for movement in the X—X axis direction. A feed screw 36 is journalled on the carriage assembly 29 and is associated with a recirculating ball nut (not shown) carried by the mounter head 27 for effecting movement in the X axis direction. A servomotor 37 drives the feed screw 36 for movement in this direction. An encoder 38 is connected with the X axis drive motor 37 so as to provide a signal indicative of the X axis position of the mounter 27.

Figure 3:
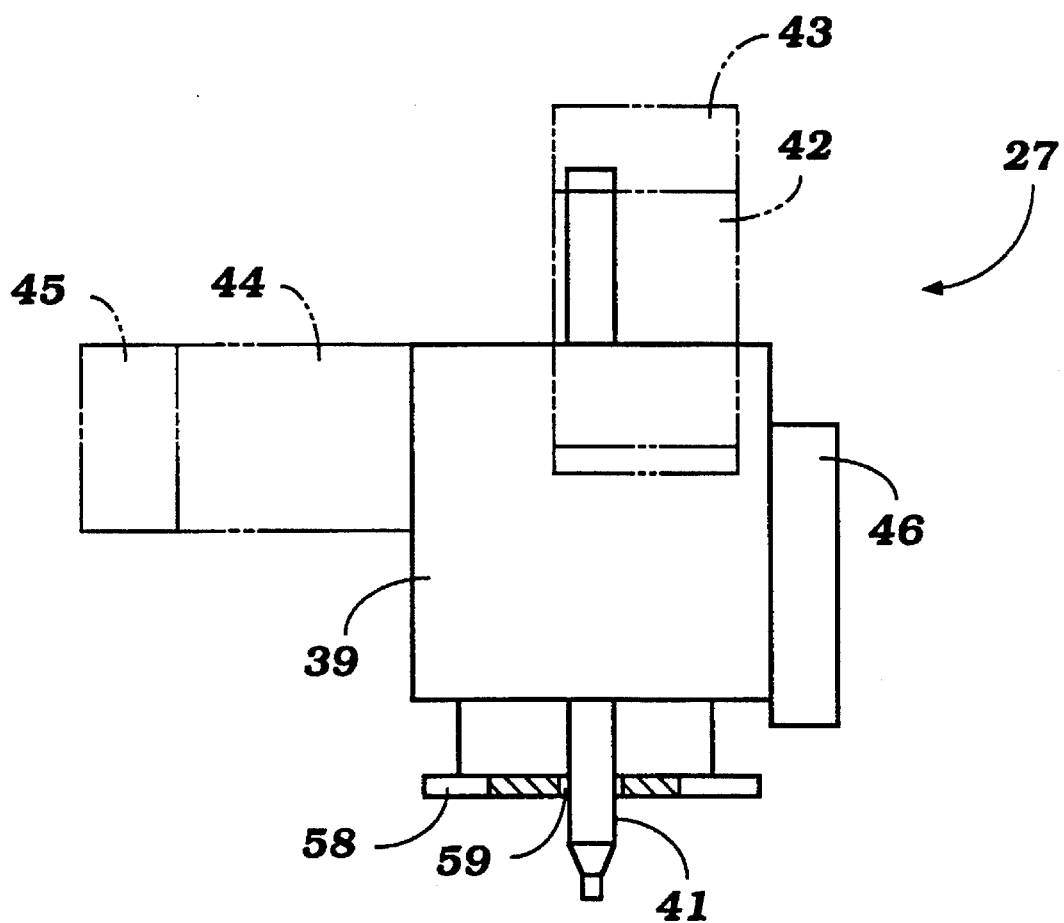
FIG. 3 is an enlarged view, taken in the same direction as FIG. 2, of the pick-up device.

Referring now additionally to FIG. 3, the pick-up head 27 includes a base assembly 39 upon which a pick-up nozzle 41 is mounted for rotation about a rotational axis R and for vertical movement about along a Z—Z axis. The rotary motion about the rotational axis is accomplished by an R axis servomotor 42 which drives the pick-up nozzle 41 about this axis in a well known manner. An encoder 43 is connected to the R axis servomotor 42 so as to output a signal to the associated computer control indicative of the R axis position of the pick-up nozzle 41 and, accordingly, any component which may be picked up by it.

Vertical movement of the pick-up nozzle 41 is accomplished by means of a Z axis servomotor 44 which is also coupled to the pick-up nozzle 41 in a known manner for effecting vertical movement. An encoder 45 is connected to the Z axis servomotor 44 so as to provide an indication of the vertical position of the pick-up nozzle 41 and a component carried by it.

The pick-up nozzle 41 is supplied with a source of reduced air pressure so as to effect a vacuum at its pickup portion so that small components can be picked up at the feeder sections 25 in a well known manner. The mechanism as thus far described and its controls may be considered to be conventional in this art and since it only is relevant for the purposes of orientation of the optical recognition system, to be described, further details of its construction are not believed to be necessary.

In addition to the components as thus far described, the pick-up head 27 further carries a camera 46 which may be of any known electronic type such as a CCD unit and which looks downwardly toward the printed circuit board 24 delivered by the conveyor 23. This camera 46 is adapted to determine or record a location marker formed on the printed circuit board 24 so as to orient the pick-up head 27 accurately relative to the position where the conveyor 23 positions the circuit board 24 in the station where components will be mounted. Said another way, the camera 46 is employed so as to orient the pick-up head relative to the location of the circuit board 24 as is well known in this art.

Figure 4:
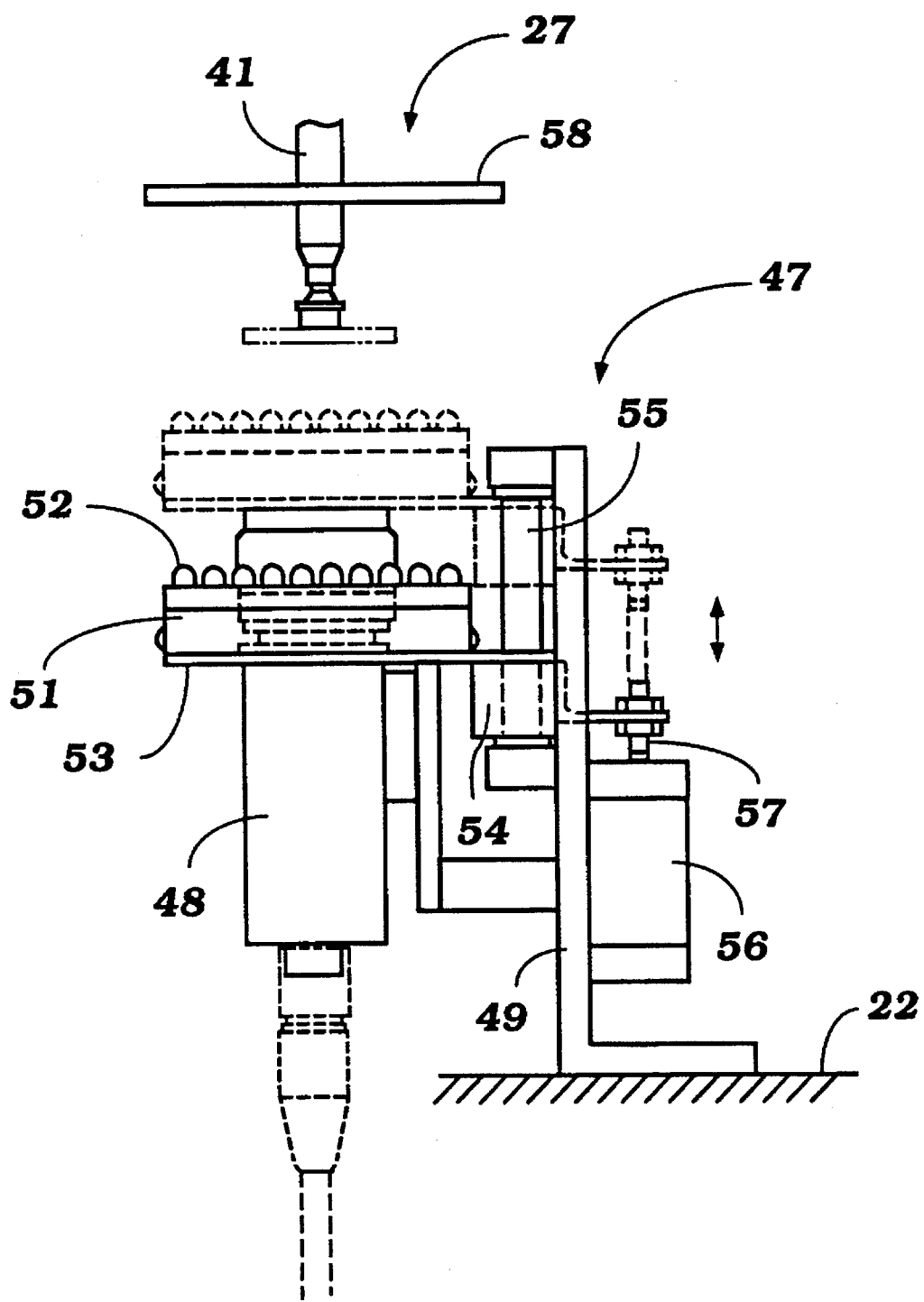
FIG. 4 is an enlarged view, taken in a direction parallel to that of FIG. 3 but at another location showing the relationship of the pick-up device to the optical sensing arrangement.

A component recognizing station, indicated generally by the reference numeral 47 is disposed at one side of the conveyor 23 and at one end at one of the feeder sections 25. This optical recognition system section 47 is shown in more detail in FIGS. 4–6 and will now be described by reference to those figures.

In accordance with the scheme of operation of the mounting apparatus 21, once a component is picked up at the appropriate feeder section 25 from the respective feeder tape 26, the various servomotors for effecting the X, Y, Z and R movement of the pick-up head 41 are operated in a known manner so as to move the pick-up nozzle 41 into registry with the optical recognition section 47. This section 47 is comprised of an electronic camera 48 which may be a CCD type of device. This camera 48 is mounted on the table of the mounting device 22 by means of a mounting bracket 49 in a fixed position. Surrounding the camera 48 is a frame assembly 51 which carries a light source such as a plurality of LEDs 52. The frame 51 is mounted for vertical movement relative to the supporting bracket 49 by a supporting member 53 which is, in turn, provided with a bearing arrangement 54 that is slidably mounted on a post 55 carried at one side of the mounting bracket 49. A pneumatic cylinder 56 has a piston rod 57 connected to the bracket 53 for moving it between a lowered, direct lighting position, as shown in solid lines in FIG. 4, and an elevated, indirect lighting position, as shown in broken lines in this figure. The reason for this will be described.

The optical sensing arrangement further includes a back screen plate 58 which is mounted on the body 39 of the pick-up device 27 and which has an aperture 59 through which the pick-up nozzle 41 extends. This back screen plate 58 is formed from a material that is translucent and thus will act as a background field for the camera 48 or as a reflective source, as will become apparent. This device 58 may be formed from a milky-like plastic material, as is well known in this art.

Figure 5:
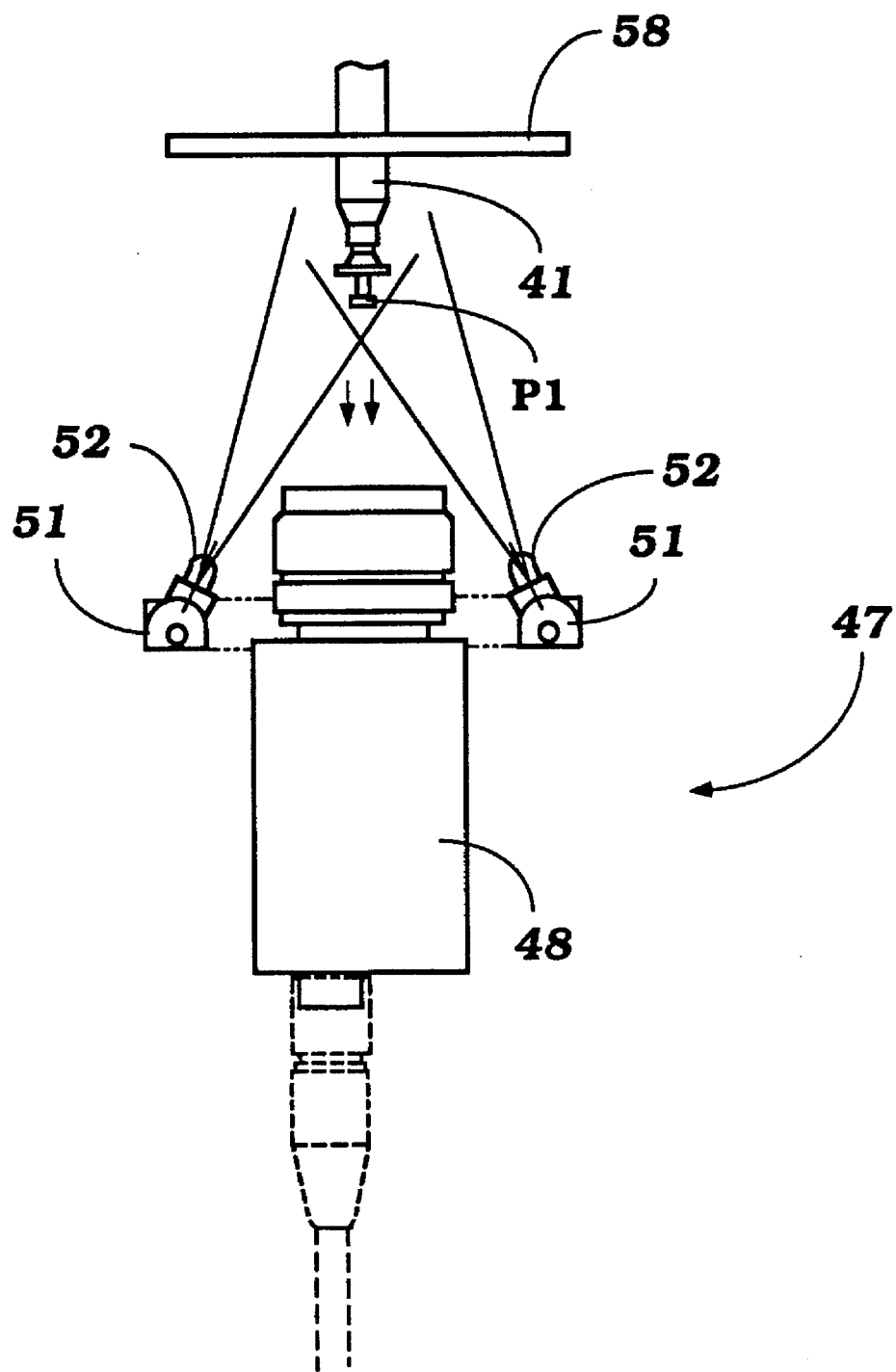
FIG. 5 is an elevational view taken at a right angle to FIG. 4 and shows one form of illumination method possible with this device.
Figure 6:
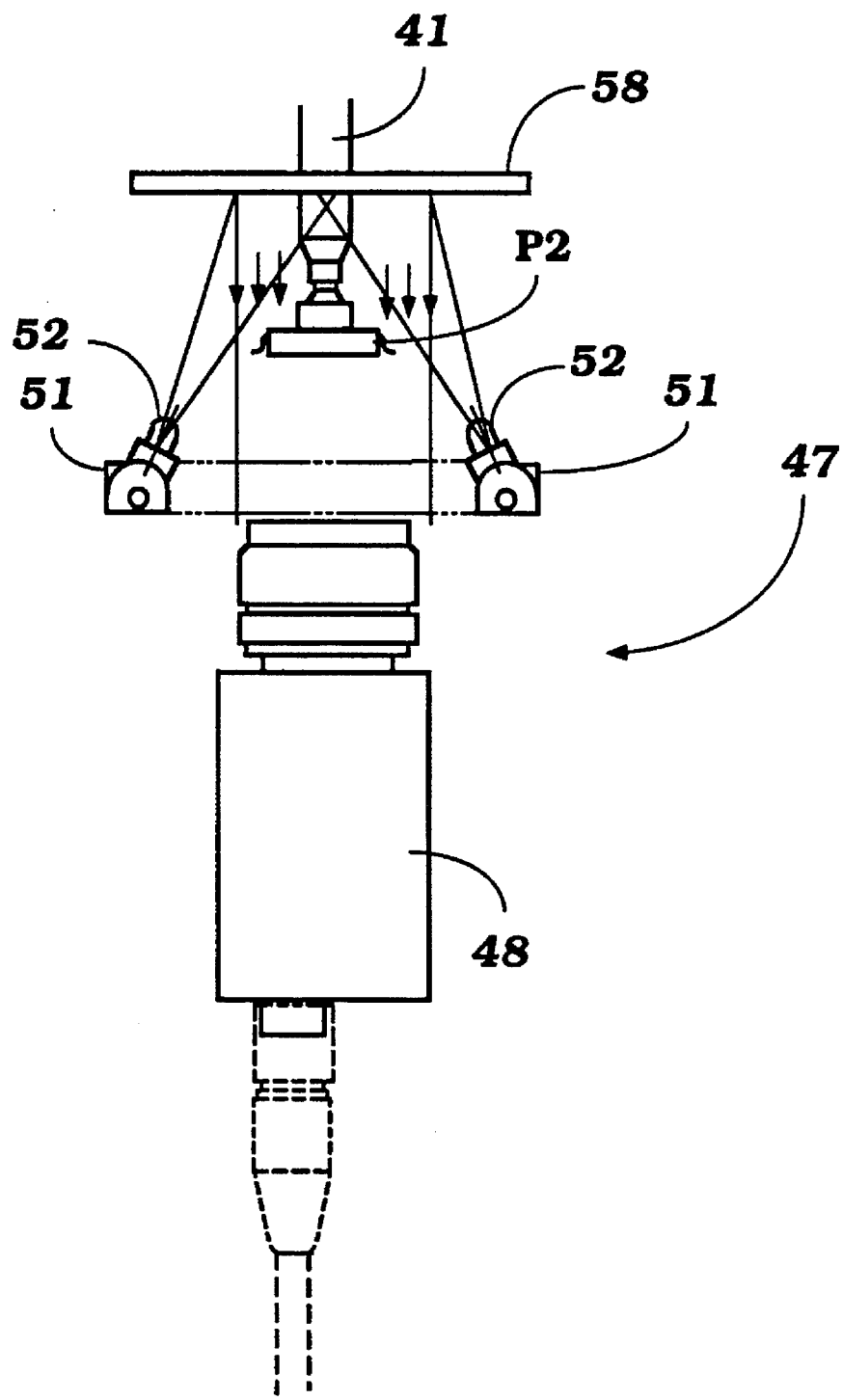
FIG. 6 is an elevational view, in part similar to FIG. 5, and shows another form of illumination method possible with this device.

FIGS. 5 and 6 show how this apparatus can be employed to provide optical recognition and position correction for a wide variety of types of components. FIG. 5 shows the situation when a component P1 is picked up by the pick-up nozzle 41. This component P1 is of a relatively small type and does not have a large number of lead wires so that it can be easily recognized by the electronic camera 48 by direct lighting. In this case, the cylinder assembly 56 is retained in the position shown in solid lines in FIG. 4 so that the light sources 52 and frame 51 are disposed approximately below the level of the lens of the electronic camera 48. Hence, direct illumination of the component P1 will cause light to be reflected back from it on the camera as shown by the solid arrows in FIG. 5. The plate 58 will provide a contrasting background so as to facilitate optical recognition and/or position correction determinations to be made.

FIG. 6 shows a situation wherein a different type of component P2 is picked up by the pick-up nozzle and this component is relatively large and also has a large number of lead wires which cause reflections from the direct lighting that would make recognition more difficult. In this instance, the cylinder 58 is energized so as to elevate the frame 51 and light sources 52 to a position above the lens of the electronic camera 48 so that the light will pass directly on the backing plate 58 and be reflected downwardly so that a shadow of the component P2 will appear on the electronic camera 48. As should be readily apparent, this type of light source would not be satisfactory for sensing an article as the article P1 in FIG. 5 because the article is smaller and the pick-up nozzle 41 would dominate the image on the camera 48 and make recognition and position sensing difficult.

FIGS. 7 through 10 show another embodiment of the invention wherein the back lighting for recognition can be achieved without necessitating a moveable light source. The components of this embodiment are basically the same as the previously described embodiment and where that is the case, those components have been identified by the same reference numerals and will not be described again, except insofar as is necessary to understand the construction and operation of this embodiment.

Figure 7:
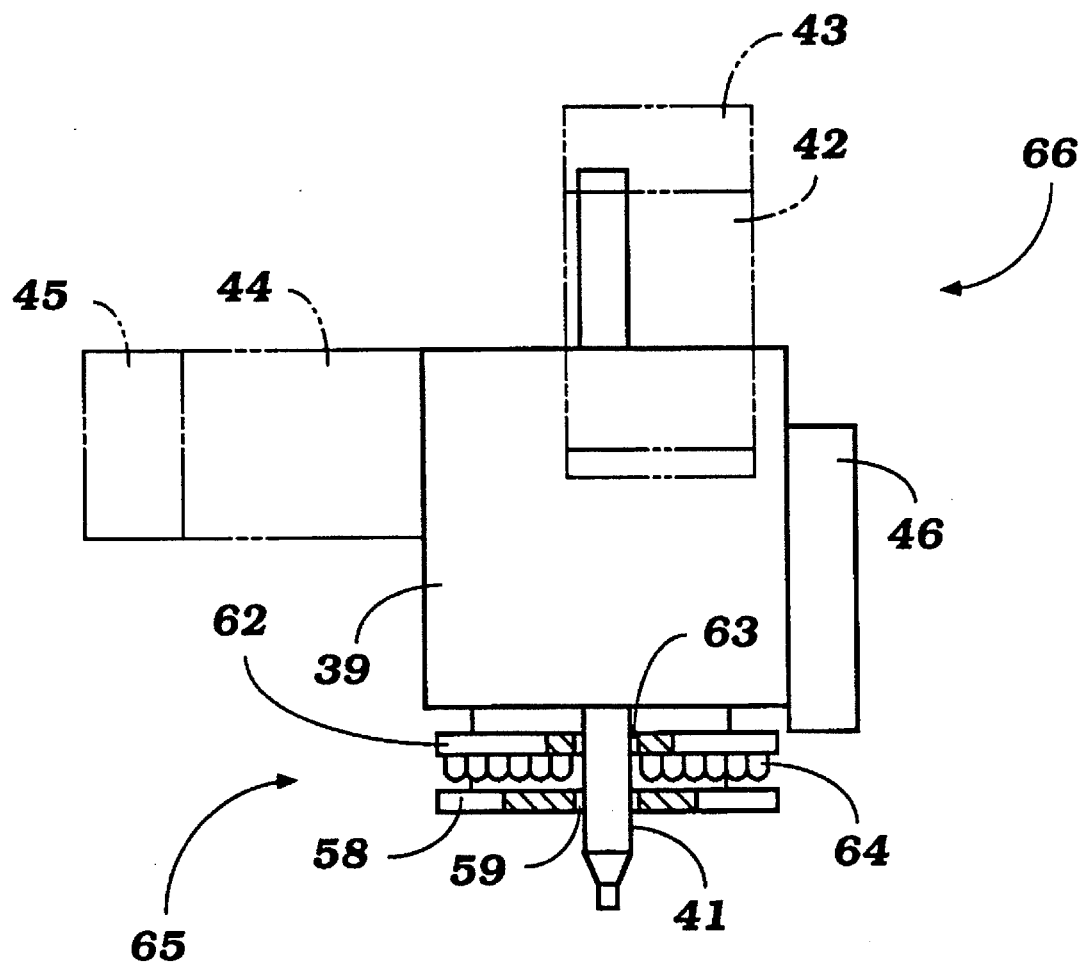
FIG. 7 is an enlarged elevational view, in part similar to FIG. 3, and shows another embodiment of light source.
Figure 8:
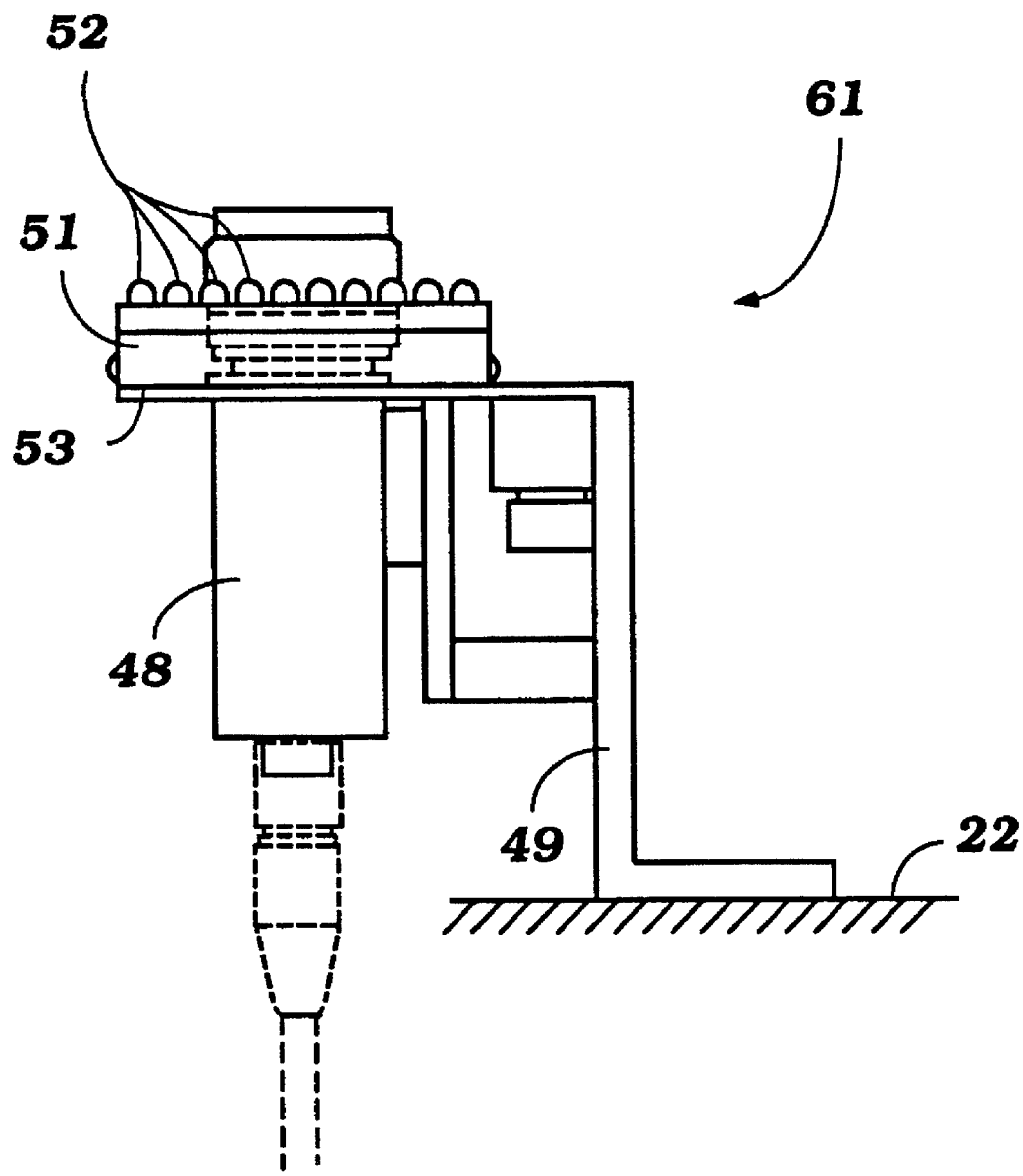
FIG. 8 is a view, in part similar to FIG. 4, and shows the camera and another light source utilized with the embodiment of FIG. 7.

As may be seen in FIG. 7, with this embodiment the light source 52 and frame 51 is held in a fixed position on the mounting bracket 49 by the bracket 53. This fixed position is the same as the position shown in solid lines in FIG. 4 and in the view of FIG. 5 of the previous embodiment. Because of this difference, the component assemblage of the camera and light source is identified by the reference numeral 61 rather than the previously utilized reference numeral 47. However, where the individuals parts are the same or substantially the same they have been identified by the same reference numerals as previously applied.

With this embodiment, the mounter head 39 is provided with a frame 62 having a central opening 63 which surrounds the pick-up nozzle 41 and which is disposed on the side of the pick-up nozzle 41 to the rear of the plate 58 and away from the camera 48. This frame 62 carries a plurality of light sources such as LEDs 64 and thus constitutes a second light source device, indicated generally by the reference numeral 65. Because of this difference, the mounter head assembly in this embodiment is identified by the reference numeral 66.

Figure 9:
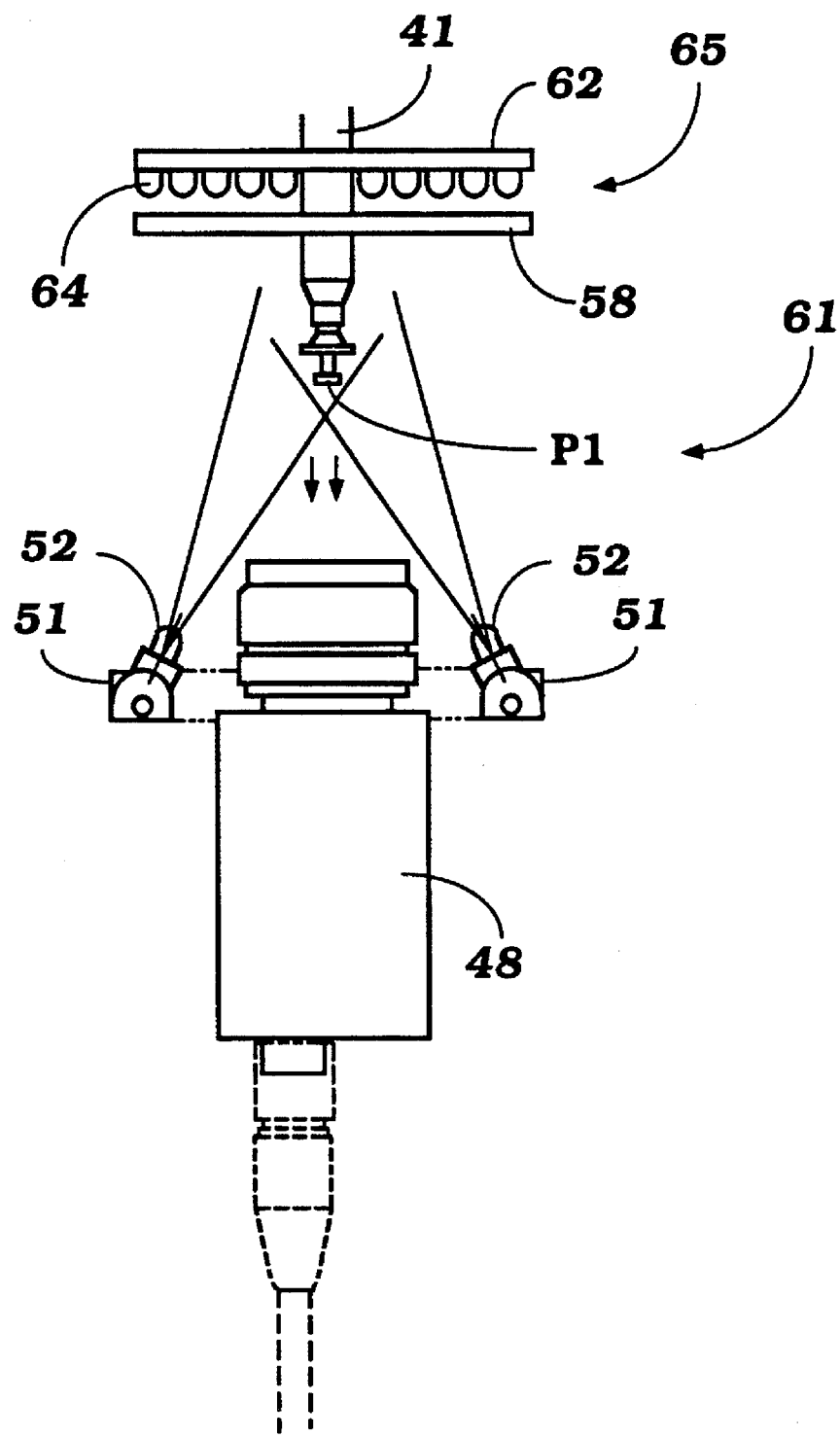
FIG. 9 is a side elevational view taken in a direction perpendicular to the direction of FIG. 8 and in the same direction as FIG. 7 and shows a first illumination method that can be employed with this embodiment.

This embodiment operates as will be described by reference to FIGS. 9 and 10 which correspond to FIGS. 5 and 6 of the previously described embodiment. As seen in FIG. 9, when a small article P1 is picked up by the pick-up nozzle 41, direct lighting is employed for recognition and in this condition, the light sources 52 are illuminated and the light sources 64 are not illuminated. Hence, this embodiment works the same as the conventional direct recognition method.

Figure 10:
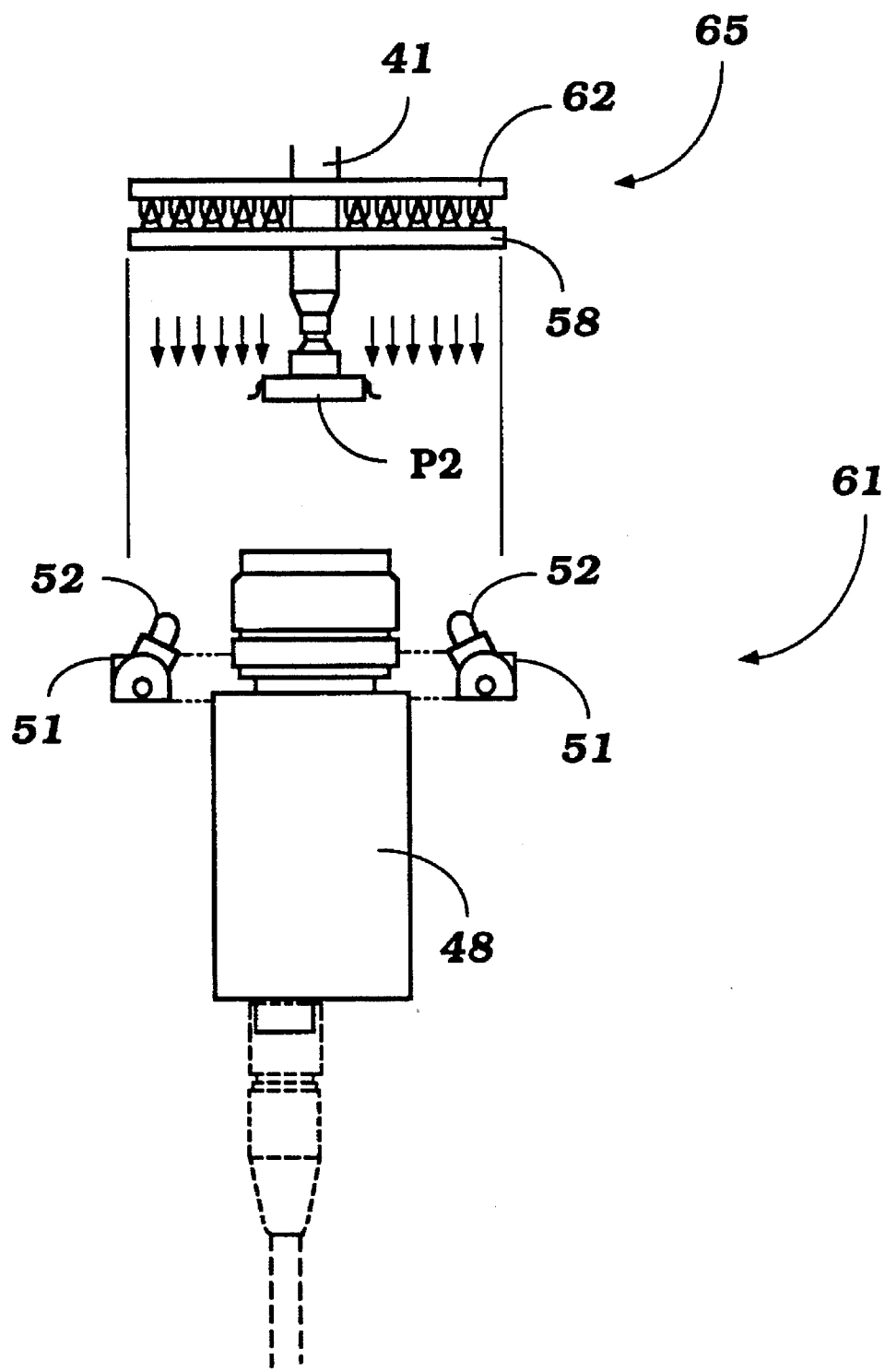
FIG. 10 is a view in part similar to FIG. 9, and shows another illumination method possible with this embodiment.

If, however, a larger article having a lot of lead wires such as the component P2 is picked up as shown in FIG. 10, then the light sources 52 are not illuminated but the light source 65 is illuminated. Because the panel 59 is translucent, the light from the sources 64 will pass through the panel 58 as shown by the arrows in this figure and the back lighting recognition method may be employed.

It should be readily apparent that the light source arrangement as shown in FIGS. 7–10 can also be utilized with a moveable light source arrangement associated with the camera 48 as in the previously described embodiment. In this way, when indirect or back lighting is required the light sources associated with the camera 48 (sources 52) will be elevated and illuminated along with the light sources 64.

It should be readily apparent from the foregoing description that the described embodiments of the invention permit recognition of a wide variety of types of components in a single station and with a minimum number of light sources. Of course, the foregoing description is that of preferred embodiments of the inventions and various changes and modifications may be made without departing from the spirit and scope of the invention, as defined by the appended claims.

We claim:

1. A recognition arrangement for a component mounter comprised of a pick-up device adapted to hold and transport components, a camera positioned on one side of said pick-up device to face one side of a component carried by said pick-up device, a light source, and a reflective device positioned on the side of said component opposite to said camera, said light source and said reflective device being relatively moveable between at least a first condition in which the side of said component facing said camera is illuminated for direct recognition of said component by said camera and a second condition wherein the back side of said component is illuminated for recognizing the shadow of said component by said camera.

2. A recognition arrangement for a component mounter as in claim 1, wherein the same camera is employed for both the first and second conditions of the light source.

3. A recognition arrangement for a component mounter as in claim 1, wherein the light source comprises a single light source.

4. A recognition arrangement for a component mounter as in claim 3, wherein the light source is moveable between a first position for performing the first condition and a second position for performing the second condition.

5. A recognition arrangement for a component mounter as in claim 1, wherein the reflective device positioned provides a contrasting background in the first condition and a reflective light source in the second condition.

6. A recognition arrangement for a component mounter as in claim 5, wherein the light source is positioned closer to the reflective device in the second position than in the first position.

7. A recognition arrangement for a component mounter as in claim 6, wherein the light source surrounds the camera.

8. A recognition arrangement for a component mounter as in claim 7, wherein the light source is moved between a lowered first position and an elevated second position.

9. A recognition arrangement for a component mounter as in claim 8, wherein the same camera is employed for both the first and second conditions of the light source.

10. A recognition arrangement for a component mounter comprised of a pick-up device adapted to hold and transport components, a camera positioned on one side of said pick-up device to face one side of a component carried by said pick-up device, a light source juxtaposed to said camera and adapted to project light toward said pick-up device and a component carried thereby and means for moving said light source between a first position and a second position relative to the component to provide different types of illumination of the component for different types of identification.

11. A recognition arrangement for a component mounter as in claim 10, further including a reflective device positioned to the rear of the component carried by the pick-up device on the side opposite that facing the camera and effective to provide a contrasting background where the light source is in the first position and a reflective light surface where the light source is in the second position.

12. A recognition arrangement for a component mounter as in claim 11, wherein the light source is positioned closer to the reflective device in the second position than in the first position.

13. A recognition arrangement for a component mounter as in claim 12, wherein the light source surrounds the camera.

14. A recognition arrangement for a component mounter as in claim 13, wherein the light source is moved between a lowered first position and an elevated second position.

* * * * *